Jan. 11, 1949.  E. M. GARDNER  2,458,845
LANDING MECHANISM FOR AIRPLANES
Filed Aug. 28, 1947  2 Sheets-Sheet 1

INVENTOR
EMIL M. GARDNER
BY
ATTORNEYS.

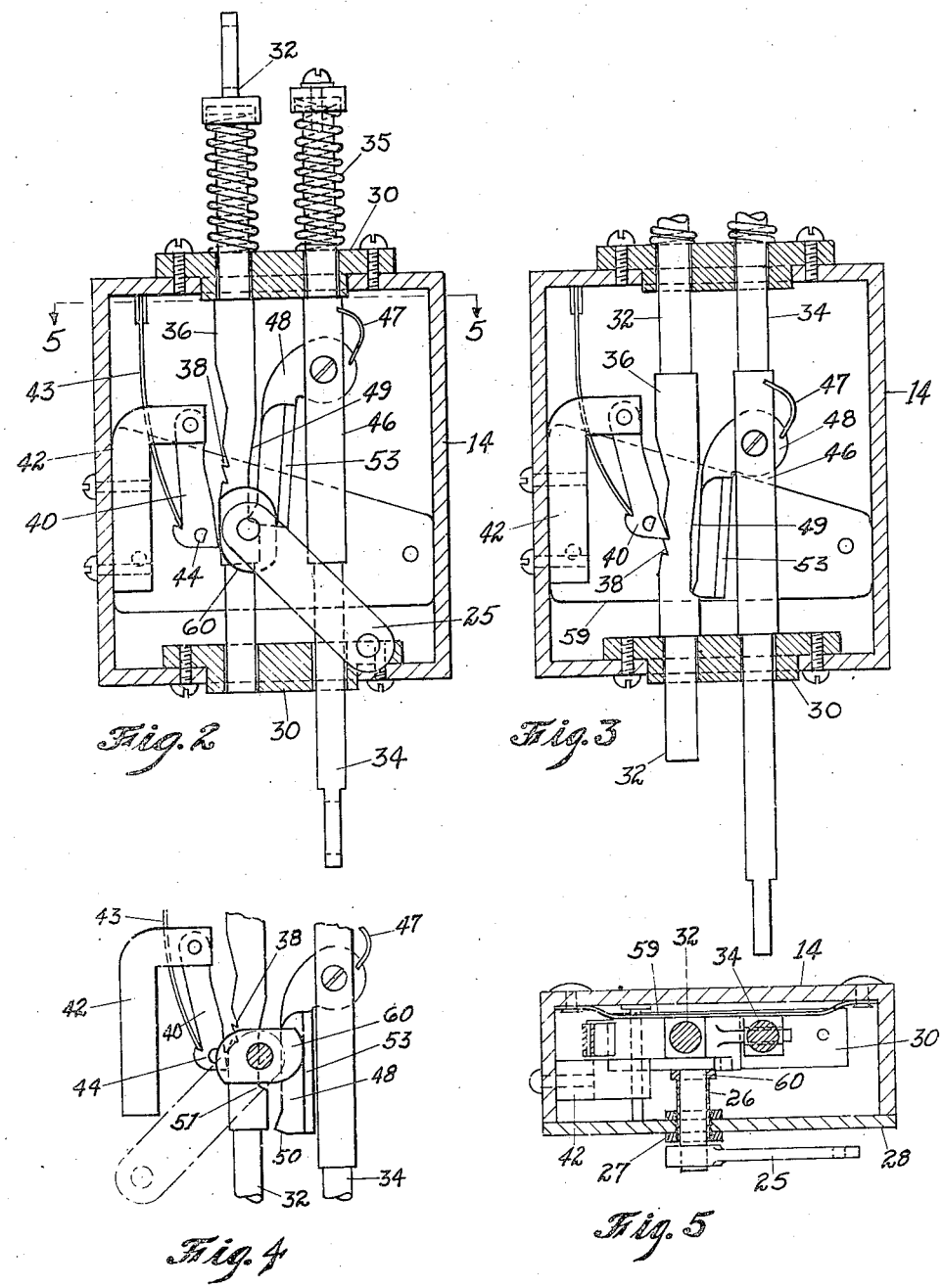

Patented Jan. 11, 1949

2,458,845

UNITED STATES PATENT OFFICE 2,458,845

LANDING MECHANISM FOR AIRPLANES

Emil M. Gardner, Barberton, Ohio

Application August 28, 1947, Serial No. 771,018

13 Claims. (Cl. 244—81)

The present invention has for its object the provision of means to aid in landing airplanes and while it may have utility for all types of heavier-than-air aircraft it is particularly designed and has especial utility in connnection with light aircraft.

Briefly stated, the invention comprises the combination of landing gear, throttle and means for reducing the lifting power of the wings at the instant that the landing wheels contact the ground. For the purpose of reducing the lifting power of the wings devices known as "spoilers" are employed, although the invention in all of its aspects is not limited to the use of spoilers, so called.

A spoiler as it is generally known, is a vane pivoted on the upper leading edge of the wing and in normal flight operations it is flush with the upper surface of the wing. When the spoiler is raised it reduces the lifting power of the wing. The invention consists in connecting and coordinating the landing mechanism with the spoiler operating mechanism so that at the first impact of the landing gear with the ground the spoilers are elevated.

It is essential that the spoilers be returned to normal position when the engine throttle is reopened. This necessitates coordination of the landing gear, the spoilers and the throttle so that when the throttle is opened the spoilers are returned to normal position.

In operation, the pilot will reduce the speed of the engine to normal idling speed as he comes in for landing. The movement of the throttle to idling position releases the mechanism which coordinates the landing gear and the spoilers so that the instant the landing wheels contact the ground, the movement of the wheels actuates the spoilers so that they are elevated to operative position. If the pilot should decide to take off again he will open the throttle and the mechanism will operate to lower the spoilers immediately. When the engine is started up preparatory to a fresh take off the spoilers will also be lowered.

In light aircraft, especially, this combination of instrumentalities, makes a smoother landing possible. Light aircraft in landing are peculiarly susceptible to the effects of gusts which tend to lift the plane off the ground. This is particularly noticeable in the tendency of such aircraft to bounce excessively when landing and is one of the major difficulties encountered in the operation of light aircraft. However, aircraft of this type equipped with the improved mechanism shown and described herein will land more smoothly and easily, because at the instant of impact the lifting power of the wings is reduced and will remain reduced while the engine is idling and while the plane is taxiing down the field.

The mechanism shown herein includes special connections between the three instrumentalities and while the drawings and description give a full disclosure of the preferred method of securing the results set forth, it is not to be taken as limiting the invention to the precise means of coordinating the several devices. It is possible to devise many forms of coordinating devices to accomplish the same purpose without departing from the underlying inventive concept as set forth in the appended claims, and while a strictly mechanical connection is preferred it is possible to utilize any of the well known hydraulic control systems for the purpose.

The drawings show the best known and preferred form of the invention, in which:

Fig. 1 is a schematic view showing the elements of the plane which are involved in the organization by which the results specified are accomplished.

Fig. 2 is a view looking at the front of the control box where the coordinating mechanism is located. In this view the front of the box has been removed but the throttle lever connection is imposed on the face of the view. The position of the mechanism is that which is assumed when the engine is idling preparatory to landing.

Fig. 3 shows the parts in the position assumed when the landing wheels are in contact with the ground and the spoilers have been raised.

Fig. 4 is a view showing the operation of the cam which is connected to the throttle which returns the spoilers to their inoperative position when the throttle is reopened.

Fig. 5 is a section on the line 5—5 of Fig. 2.

Figure 1:
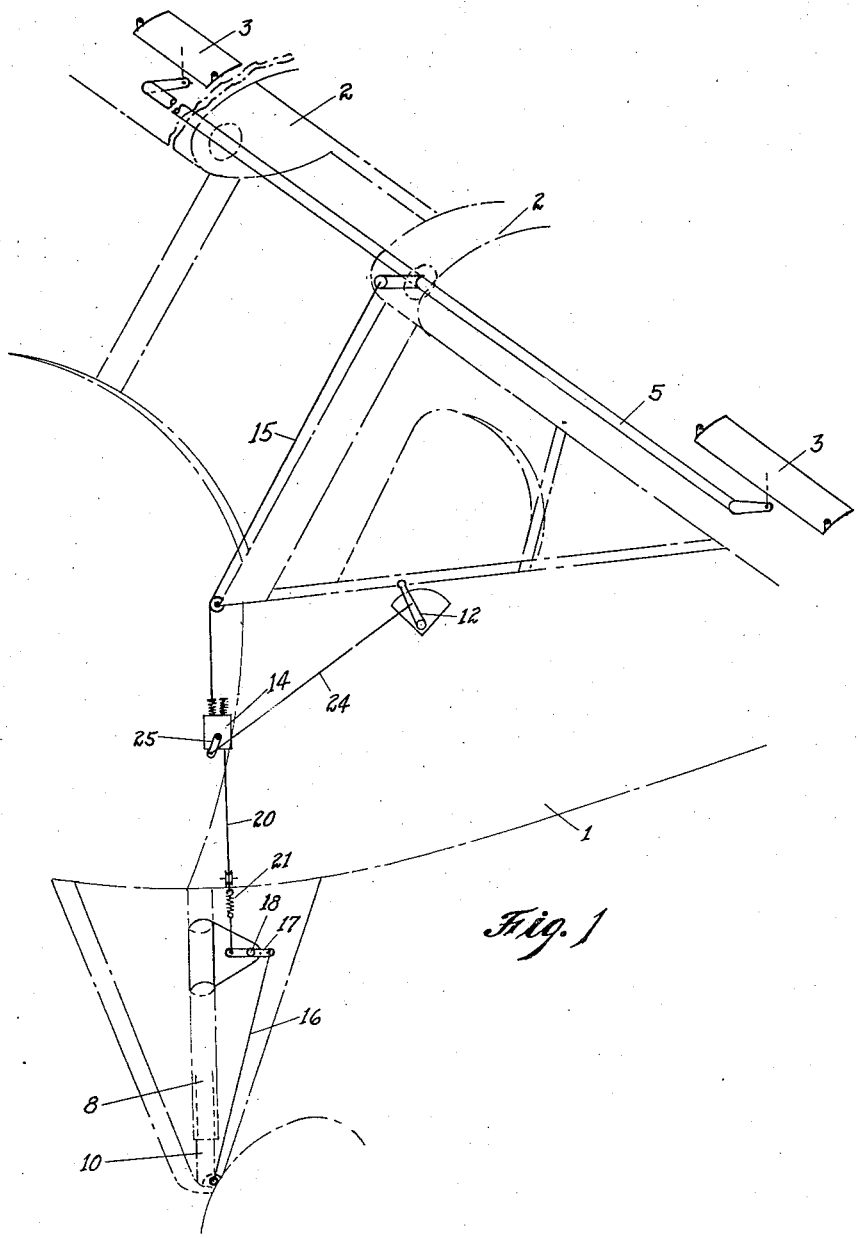

Details of the landing gear and spoilers are not shown except as may be necessary for a complete understanding of the invention. Devices of this character are well known and either one may be of standard design.

In the drawings, I represents the outline of the fuselage and 2 the wings of any standard plane. The numeral 3 is applied to the pivoted spoiler vanes, which are raised and lowered by any suitable means such as a shaft 5 connected to both spoilers so that they operate in unison. In normal operation the spoilers are lowered so that they offer no resistance, but when raised they reduce the lifting power of the wings to a material extent. It will be understood that while conventional spoilers are shown and this term will be used throughout the specification and claims, it is not intended that the invention shall be confined to the use of these specific devices and that other equivalent means for reducing the lift of the wings may be employed in lieu thereof. The term "spoiler" is intended to be generic to all devices which will perform a similar function.

The numeral 8 is applied to the landing gear shown diagrammatically in Fig. 1. As in all types of landing gear the wheels are mounted on a spring loaded support or leg indicated at 10 which cushions the impact with the ground.

The numeral 12 indicates the throttle by which the pilot controls the engine speed, and the numeral 14 indicates the control box in which the coordinating mechanism is located by which the several instrumentalities are operated. As shown in Fig. 1, a cable 15 leads from the spoiler operating shaft 5 to the control box. The movable landing wheel support 10 is connected by a rigid link 16 to a lever 17 pivoted at 18 on the landing gear. The other end of the lever 17 is connected by a cable 20 to the control mechanism, a spring 21 being incorporated in the cable. When the support 10 is moved upwardly by the contact of the landing wheels with the ground the cable 20 is moved downwardly. The throttle 12 is connected by link 24 to a lever arm 25 secured to the end of shaft 26 mounted in a bearing 27 in the cover 28 of the control box (see Fig. 5).

Located in the top and bottom walls of the control box are the two guide plates 30 provided with aligned apertures to receive the two control rods to be described. The numeral 32 is applied to the spoiler control rod to the upper end of which is attached the cable 15, a spring 33 surrounding the rod 32 and urging it upwardly. The numeral 34 is applied to the landing gear rod which is connected at its lower end to the cable 20, a coil spring 35 also urging this rod upwardly. The rods 32 and 34 are coupled together for conjoint operation during landing as will be described.

Within the control box the rod 32 is formed with an enlarged flattened area 36 which, bearing against the underside of the upper plate 30 or the upper side of the lower plate, acts to limit the extent of movement of the rod. Midway of the area 36 the edge of the rod is formed with a plurality of ratchet teeth 38 which are in the path of and adapted to be engaged by the end of a detent 40 pivoted at its upper end to a bracket 42 in the inside of the box and urged toward the rod by a spring 43. The location of the teeth 38 and the detent 40 is such that when the rod 32 is in lowered position, which is at the time the spoilers are raised, the rod will be held in that position. Located on the lower end of detent 40 is a pin 44 for a purpose to be described.

The rod 34 has a similar square portion 46 which limits the vertical movement of this rod and pivoted on that portion of the rod on the side next to the rod 32 is a latch or pawl 48 which is yieldingly pressed toward the rod 32 by the spring 47. The lower outer end of the latch 48 is provided with a beveled bearing surface 50 which is in the path of shoulder 51 formed on the adjacent side of the rod 32 at the base of a cut out portion 49. A rib or ledge 53 extends laterally from the side of the latch 48.

When the engine is idling the pawl or latch 48 engages and bears against the shoulder 51 on the rod 32. When the landing wheels strike the ground the rod 46 is moved downwardly and the latch 48 moves the rod 32 downwardly therewith so that the detent 40 engages a tooth 38 holding the spoilers in raised position. This constitutes the particular means employed in the preferred design for raising the spoilers the instant the wheels touch the ground. The spoilers will remain in elevated position so long as the detent 40 is not disturbed.

For coordinating the throttle operation with the other instrumentalities, the shaft 26 is extended to a point lying between the pin 44 and the ledge 53 where it carries a cam 60 shaped in the form shown in Fig. 4. When the narrow part of this cam is located between 44 and 53 as shown in Fig. 2, which is while the engine is idling, the two pawls or detents 40 and 48 are pressed against the opposite sides of the rod 32, the pawl 40 being in position to engage the rod 32 and hold the spoilers in raised position, and the pawl 53 is in position with its lower end contacting the shoulder 51. Therefore, when the throttle is moved to idling position ready for landing the mechanism is in such condition that the instant the wheels strike the ground the rod 32 is depressed, raising the spoilers.

When the throttle is opened, however, the cam 60 moves to the position shown in Fig. 4 and by moving the pin 44 and the ledge 53, both of these pawls are moved out of engagement with the rod 32 and the rod is released and rises to return the spoilers to inoperative position. The rod 46 is now free to move up and down without affecting the rod 32 or changing the position of the spoilers, the ledge 53 being of sufficient extent so that the cam will hold the pawl 48 out of contact with the rod 32 during the oscillation of the rod caused by the movement of the landing wheels. It will also be noted that during taxiing over the field after landing, the rod 46 is free to move with the surface of the pawl 48 riding over the curved surface 49. A bearing plate 59 attached to the rear wall of the control box steadies the two rods 32 and 34 in their movements.

It will thus be seen that the stated objects of the invention have been attained. As the pilot shuts off the motor preparatory to landing the cam 60 permits both pawls to move toward the rod 32, the surface 50 bearing on the shoulder 51 in position to move the rod 32 downwardly the instant that the landing wheels strike the ground. The lower end of the pawl 40 is at this time bearing against the rod 32 below the notches 38. When the wheels strike the ground the downward movement of rod 34 also moves the rod 32 downward until it is engaged by the detent 40 which holds it in lowered position with the spoilers raised until the pilot again opens the throttle which releases the detent 40 and holds it and the pawl 48 out of the path of the rod 32 so that the spoilers instantly return to inoperative or lowered position.

While the foregoing description taken in connection with the drawings gives a full and complete disclosure of the mechanism which has been perfected for accomplishing the stated objects of the invention, it will be borne in mind that changes and modifications may be made therein without sacrificing any of the benefits of the invention. It is conceivable that the releasable coupling between the landing wheels and the spoiler operating mechanism may be varied substantially without affecting in any way the basic features of the invention.

What is claimed is:

1. Mechanism for improving the landing of an airplane comprising spoilers for reducing the lifting power of the wings thereof, said spoilers being normally in inactive position, landing gear including a movable landing wheel support, a throttle, and mechanism for coordinating the operation of the spoilers, landing gear and throttle comprising an element movable by the impact of the landing gear with the ground and a second element connected to the spoilers, and means to transmit the movement of the first element to the second element when said elements are coupled to shift the spoilers to active position, and a control device connected to the throttle and movable by the movement of the throttle to idling position to couple said elements.

2. Mechanism for improving the landing of an airplane comprising spoilers for reducing the lifting power of the wings thereof, said spoilers being normally in inactive position, landing gear including a movable landing wheel support, a throttle, and mechanism for coordinating the operation of the spoilers, landing gear and throttle comprising an element movable by the impact of the landing gear with the ground and a second element connected to the spoilers, and means to transmit the movement of the first element to the second element when said elements are coupled to shift the spoilers to active position, and a control device connected to the throttle and movable by the movement of the throttle to idling position to couple said elements and by movement of the throttle from idling position to uncouple said elements.

3. In an airplane, the combination of spoilers, landing gear and a throttle, a releasable coupling between the landing gear and the spoilers, and means actuated by the movement of the throttle to make the coupling when the throttle is moved to idling position and to break the coupling when the throttle is moved out of idling position.

4. In an airplane, the combination of spoilers, landing gear and a throttle, said spoilers being normally in inactive position, a spoiler control member movable to shift the spoilers to active position, a second member connected to the landing gear and movable thereby when the landing gear contacts the ground, a releasable coupling between said members, and a control device for said coupling and connected to the throttle and movable thereby to make the coupling or to release the coupling as the throttle moves into and out of idling position respectively.

5. In an airplane, the combination of spoilers, landing gear and a throttle, said spoilers being normally in inactive position, a spoiler control member movable to shift the spoilers to active position, a detent to hold the member in that position, a second member connected to the landing gear and movable thereby when the landing gear contacts the ground, a releasable coupling between said members, and a control device for said coupling and connected to the throttle and movable thereby to make the coupling when the throttle is in idling position.

6. In an airplane, the combination of spoilers, landing gear and a throttle, said spoilers being normally in inactive position, a spoiler control member movable to shift the spoilers to active position, a detent to hold the member in that position, a second member connected to the landing gear and movable thereby when the landing gear contacts the ground, a releasable coupling between said members, and a control device for said coupling and connected to the throttle and movable thereby to make the coupling when the throttle is in idling position and to break the coupling and release the detent when the throttle is opened.

7. In an airplane, the combination of spoilers, landing gear and a throttle, said spoilers being normally in inactive position, a spoiler control member movable to shift the spoilers to active position, a detent to hold the member in that position, a second member connected to the landing gear and movable thereby when the landing gear contacts the ground, a releasable coupling between said members, and a cam located between the coupling and the detent and actuated by the opening movement of the throttle to release the detent and break the coupling.

8. In an airplane, spoilers on the wings of the plane and normally in inactive position, landing gear and a throttle and a control unit to coordinate the operation of said instrumentalities, said unit comprising a rod connected to the spoilers, a second rod connected to the landing gear and movably thereby, a pawl on the second rod engageable with the first named rod to couple said rods for joint movement, a detent to hold the first named rod in position with the spoilers raised, and means actuated by the movement of the throttle to release the detent and the pawl from engagement with the first named rod when the throttle is open.

9. In an airplane, spoilers on the wings of the plane and normally in inactive position, landing gear and a throttle and a control unit to coordinate the operation of said instrumentalities, said unit comprising a rod connected to the spoilers, a second rod connected to the landing gear and movable thereby, a pawl on the second rod engageable with the first named rod to couple said rods for joint movement, a detent to hold the first named rod in position with the spoilers raised, and means actuated by the movement of the throttle to release the detent and the pawl from engagement with the first named rod when the throttle is open and to permit the pawl and the detent to engage the first named rod when the throttle is in idling position.

10. In an airplane, spoilers on the wings of the plane and normally in inactive position, landing gear and a throttle and a control unit to coordinate the operation of said instrumentalities, said unit comprising a rod connected to the spoilers, a second rod connected to the landing gear and movable thereby, a pawl on the second rod engageable with the first named rod to couple said rods for joint movement, a detent to hold the first named rod in position with the spoilers raised, and a rotatable cam connected with the throttle and lying between the pawl and the detent, said cam when the throttle is open holding the detent and the pawl out of engagement with the first named rod.

11. In an airplane, spoilers on the wings of the plane and normally in inactive position, landing gear and a throttle and a control unit to coordinate the operation of said instrumentalities, said unit comprising a rod connected to the spoilers, a second rod connected to the landing gear and movable thereby, a pawl on the second rod engageable with the first named rod to couple said rods for joint movement, a detent to hold the first named rod in position with the spoilers raised, and a rotatable cam connected with the throttle and lying between the pawl and the detent, said cam when the throttle is open holding the detent and the pawl out of engagement with the first named rod, but allowing said detent and pawl to engage the first named rod when the throttle is in idling position.

12. An airplane having spoilers and a landing gear and a control unit to coordinate the operation of the spoilers and the landing gear, said unit including a coupling between the spoilers and the landing gear so that the impact of the landing gear with the ground raises the spoilers, a detent to hold the spoilers in raised position, a throttle and means operable with the movement of the throttle to disconnect the coupling and release the detent as the throttle is opened.

13. An airplane having spoilers and a landing gear and a control unit to coordinate the operation of the spoilers and the landing gear, said unit including a coupling between the spoilers and the landing gear so that the impact of the landing gear with the ground raises the spoilers, a detent to hold the spoilers in raised position, a throttle and means operable with the movement of the throttle to engage the detent and the coupling as the throttle is closed and to disconnect the throttle and release the detent as the throttle is opened.

EMIL M. GARDNER.

REFERENCES CITED

The following references are of record in the file of this patent:

UNITED STATES PATENTS

| Number | Name | Date |
| --- | --- | --- |
| 1,845,960 | Daniell | Feb. 16, 1932 |
| 1,945,214 | Black | Jan. 30, 1934 |
| 2,410,855 | Koppen | Nov. 12, 1946 |

FOREIGN PATENTS

| Number | Country | Date |
| --- | --- | --- |
| 51,939 | Austria | Jan. 25, 1912 |
| 852,753 | France | Nov. 9, 1939 |